March 13, 1962 M. R. ANTOLINO 3,024,492
METHOD OF AND APPARATUS FOR CURING THERMOSETTING MATERIALS
Filed June 30, 1958 4 Sheets-Sheet 1

INVENTOR.
MICHAEL R. ANTOLINO
BY
James G. Bethell
ATTORNEY.

March 13, 1962 M. R. ANTOLINO 3,024,492
METHOD OF AND APPARATUS FOR CURING THERMOSETTING MATERIALS
Filed June 30, 1958 4 Sheets-Sheet 3

INVENTOR.
MICHAEL R. ANTOLINO
BY
ATTORNEY.

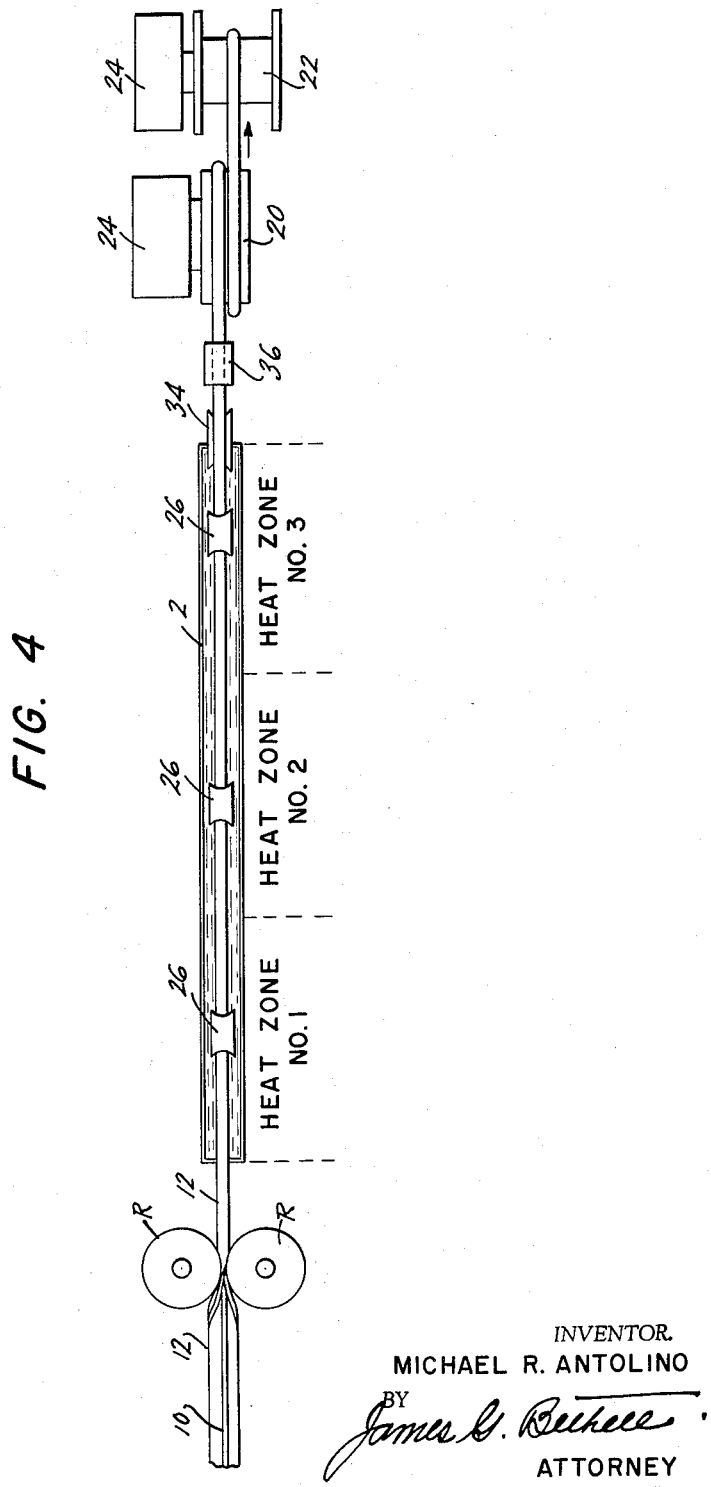

United States Patent Office 3,024,492
Patented Mar. 13, 1962

3,024,492
METHOD OF AND APPARATUS FOR CURING THERMOSETTING MATERIALS
Michael R. Antolino, Lodi, N.J., assignor to The Okonite Company, Passaic, N.J., a corporation of New Jersey
Filed June 30, 1958, Ser. No. 745,405
6 Claims. (Cl. 18—6)

My invention relates to a method of and apparatus for heat-treating, hereinafter referred to as "curing," thermosetting materials such as, for example, natural rubber, synthetic rubber, and silicones.

One of the objects of my invention is to provide a method and apparatus for the curing of thermosetting materials which may be employed with equal facility to long or short runs without loss of substantial quantities of the material being treated, as distinguished from prior methods in which the material is passed through a steam tube in the order of 200 feet in length. Not only does such prior equipment occupy large floor space, but in setting up for a run, several thousand feet of material may be lost before proper running conditions have been established. Such prior method has the further disadvantage that, should it be necessary to stop a run before it is completed, the material within the tube becomes overheated and overcured and, consequently, ruined.

In the practice of my invention I have obtained excellent results employing an open tank about 25 feet long, as distinguished from the 200-foot tube above referred to, with the additional advantage that a run can be stopped and started at will without loss of material.

My invention provides for a very rapid transfer of heat to the thermosetting material being treated, and in its passage through the curing medium the material is subjected progressively to gradually increasing elevated temperatures and to gradually increasing hydrostatic pressure as well, both of which may be varied simultaneously or individually to suit the characteristics of the thermosetting material being treated and to obtain the type of cure desired. This capability of manipulation of temperature and pressure promotes the production of a product uniformly cured throughout in that it enables me to avoid complete curing at the surface before curing below the surface has been effected, and it enables me to accommodate my method to many different types of thermosetting materials and to materials varying over a wide cross-sectional range.

In addition to the foregoing, the deleterious gases evolved within the material in the practice of my invention not only are allowed to escape from the surface of the material but are instantly and automatically removed from its vicinity without loss of pressure on the material.

In general, my invention provides for the curing of thermosetting materials by advancing the material through an open static body or bath of molten metal while gradually increasing the temperature and pressure to which the material is subjected by the molten metal as the material advances through the bath. The gradually increasing hydrostatic pressure of the metal on the material, during the passage of the material through the static molten metal bath, subjects the surface of the material to a controlled, gradual, smoothing action due to the movement of the material through the static, high-gravity molten metal, to massage the surface of the material to a smooth texture. This massaging action is gentle at first while the material is soft and easily deformed and gradually increases as the material travels deeper into the bath and begins to cure.

My invention is applicable to the curing of thermosetting materials in a great variety of forms. The material may be in the form of a rod, tube, or sheet; it may be in the nature of a mere film over a core of some sort; or it may take the form of an insulating wall or sheath about a conductor, as in the wire and cable industry, for instance. These are but examples of the fields of use in which my method and apparatus may be employed, and they are not to be taken by way of limitation.

It will be appreciated that the material to be treated is preformed, regardless of whether it is in the form of a rod, a film over a core, an insulating sheath about a conductor, etc. Preforming may be effected remote from the curing area, but it is preferable for many reasons to preform in a continuous operation immediately adjacent the curing area and continuously to advance the material as it is preformed into and through the molten metal.

In the electric wire and cable industry, for example, several methods are employed in producing continuous lengths of metal core of conductor sheathed in thermosetting material. In one method, the uncured ("green") material is extruded about the core and subsequently cured by passing the assembly through a steam tube, as above noted. In another method, plies of "green" thermosetting material are folded longitudinally about the metal core to bring the plies forcibly into abutting relation so that the plies are formed into close-fitting tubes about the metal core. This assembly is then enclosed in a thin sheath of tin or other suitable metal and then cured in a suitable oven, after which the temporary metal sheath must be removed.

In the practice of my invention, if the thermosetting sheath is applied by the first method referred to, the assembly is passed immediately and directly into the molten metal. If the second method referred to is employed for sheathing, I omit the temporary metal sheath entirely and merely fold the ply or plies of thermosetting material about the conductor as above described and continuously pass the assembly, as it is being formed, into and through the molten metal bath.

Inasmuch as the curing bath or mass is molten metal, I make use of the pressure differences within such a mass at different depths by gradually increasing the depth of submergence of the thermosetting material in the bath. This makes my method very flexible and enables me to cure many types of thermosetting materials while conforming the curing step to the characteristics of the specific material being processed.

In addition to this novel feature, I provide for the establishment of several heat zones within the bath, maintained at different temperatures, which may be varied at will. This enables me gradually and progressively to increase the temperature on the material in step with the gradual increase in hydrostatic pressure and not only permits my method to conform to the characteristics of the specific material being processed, but it eliminates the danger of over-curing of the surface of the material before its interior has been cured. These novel features of my invention are of further advantage in connection with the curing of thermosetting materials because in the curing of such materials the rate of formation of the deleterious gaseous by-products of the curing reaction and the rate of their removal from the thermosetting material are of great importance and depend upon the temperature of the material as well as the pressure on the material. By employing the heat zones referred to, I am able gradually and progressively to increase the temperature of the material, and by gradually and progressively increasing the depth of submergence of the material in an open, unsealed molten metal bath, I am able gradually and progressively to increase the pressure on the material, thereby enabling me to control the rate of formation of the deleterious gaseous by-products of the curing reaction as well as their rate of escape from the material. Thus I avoid too rapid and too early production of these gases and, at the same time, promote their immediate removal from the vicinity of the curing reaction so as to avoid reversion—reversal of the curing reaction—due to re-entry of these gases into the reaction.

Preferably, though not necessarily, I float a layer of inert material, for example talc, of substantial depth or thickness upon the surface of the molten metal, which retards oxidation and drossing of the molten metal. This layer is also of advantage in that, as the material passes from the extruder into the tank, it first passes through this hot talc, and the heat of the talc is transferred to it. I have found that this aids in preventing deformation of the "green" material upon entering the tank.

Since the thermosetting material to be processed is tacky in its green state, I dust it with talc or pass it through a layer of inert material before it enters the molten metal bath, for there is a tendency for the molten metal to adhere to the material being treated, and I have found also that, if the cured material passes out of the bath at rather a steep angle, the force of gravity will aid in removing any metal adhering to its surface. When deemed necessary or desirable, I may have the cured material exit from the bath through a mass of sand, for example, and may even impinge jets of compressed air about the surface of the cured material, effectively to remove any remaining particles of talc, metal, or sand which may be clinging to the surface.

In the accompanying drawings I have illustrated two embodiments of apparatus suitable for the practice of my invention.

FIG. 4 is a fragmentary plan view of still another form of apparatus for the practice of my improved method.

Figure 1:
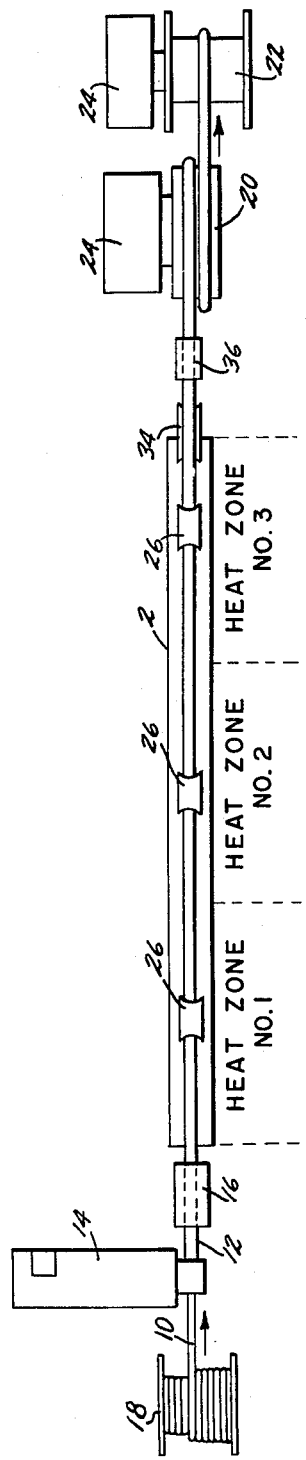
FIG. 1 is a top plan view of one form of my improved apparatus.
Figure 2:
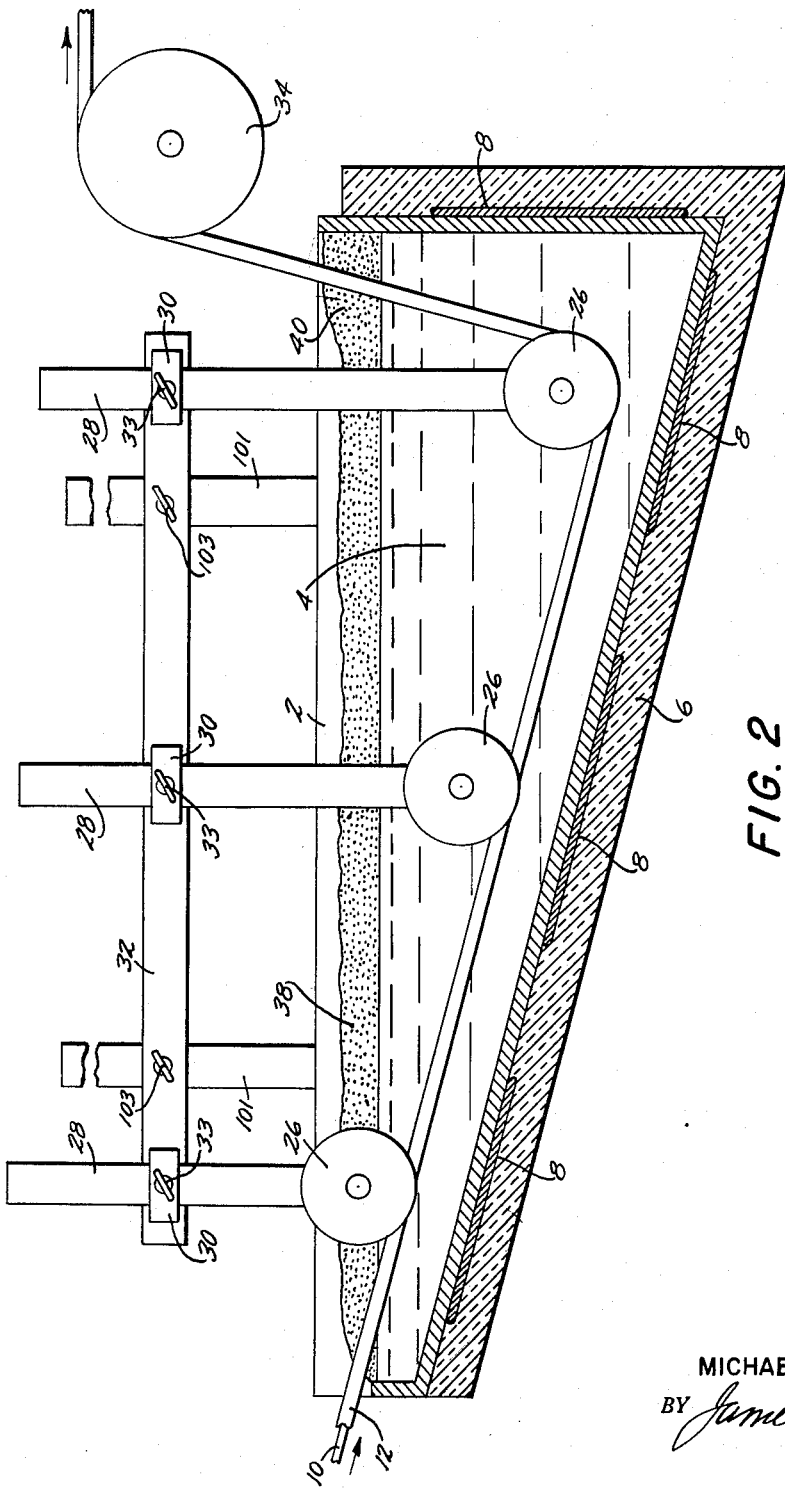
FIG. 2 is a sectional, side-elevational view of part of the apparatus of FIG. 1.

Referring in detail first of all to the apparatus of FIGS. 1 and 2, this apparatus comprises an open metal tank 2, containing a static mass or bath of molten metal 4. The tank is insulated with heat insulation 6.

8 designates electric strip heaters shown disposed at various areas along the exterior of the tank between the tank and its insulation 6. While these heaters have been located outside the tank, they may be located within the tank, if desired. The heaters 8 are disposed in spaced relation to each other and are independently controllable so as to enable me to establish different heat zones within the mass of molten metal 4. For example, in FIG. 1 I have arbitrarily indicated three heat zones, to which I have applied the legends "Heat Zone No. 1," "Heat Zone No. 2," and "Heat Zone No. 3." It will be appreciated that the number of heat zones may be varied, and that, while the heaters are so set that Heat Zone No. 1 is at the lowest temperature, and Heat Zone No. 3 is at the highest temperature, the temperature range from minimum to maximum will depend upon the material being treated.

The molten metal 4 may be any of the various metals or alloys which have a melting point below the desired temperature of the minimum-temperature heat zone, and which will not oxidize or dross too rapidly at the desired temperature of the maximum-temperature heat zone required for the material being processed. For example, the ternary eutectic of bismuth, tin, and lead melts at a temperature, of approximately 207° F., which is below the temperature found suitable for Heat Zone No. 1 when processing silicone, for example. Such an alloy does not deteriorate appreciably at the temperature of Heat Zone No. 3 and is extremely fluid at high temperature and, hence, easy to remove completely from the surface of the material being processed as the materials exits from the tank.

For purposes of illustration and clarity of description I have shown a wire or core 10 as the article to be passed through the molten metal 4 so as to cure its thermosetting covering 12. The covering 12 may be a relatively thick insulating wall, or it may be a mere film over the primary insulation of the core and may be applied in any suitable fashion and subsequently passed through the molten metal 4; or the core, as it is being covered, may pass directly into the metal bath. The latter procedure has been illustrated.

Adjacent the entry end of the tank 2, the left-hand end as viewed in FIG. 1, I have shown applicator 14 for applying the thermosetting material to the wire. This means may be the conventional extruding head, or the covering may be applied by the strip method. In the strip method, an uncured strip of the covering materials is folded longitudinally about the core to bring the opposed edges of the strip into abutting relation. Formerly, a thin tin sheath was then applied about the covering. I omit this metal sheath. As both of these devices are well known in the industry, it was considered unnecessary to illustrate them in detail.

Between the applicator 14 and the tank 2 I may provide a talc dusting box 16, through which the insulated or covered core passes on its way to the tank.

18 designates a let-off reel in front of the applicator 14. This reel carries the core supply 10.

Beyond the tank 2 I provide capstan 20 and take-up reel 22. The motors and gear boxes for driving these two elements have been designated 24.

Within the tank 2 I provide a plurality of rollers 26, vertically adjustable independently of each other. Each roller is mounted on a vertically extending rod 28, each rod passing through a collar 30, carried by a frame member 32, adjustably supported from tank 2 by supports 101 and secured by wing bolts 103. The rods 28 may be manually and individually adjusted in collar 30 for varying the depth of submergence of the rollers 26 in the molten metal 4, gradually and progressively to increase the depth of submergence of and, hence, hydrostatic pressure on the material as it is passing through the molten metal. The rods may be held in adjusted position by screws 33. Frame 32 may be raised or lowered with respect to tank 2 to provide for withdrawing the rollers 26 from tank 2 by sliding frame 32 up or down supports 101 and making it fast with wing nuts 103.

Just above the tank, at the exit end thereof, I provide a roller 34, and between it and the capstan 20 I provide an air wiper 36.

A relatively thick layer 38 of talc, for example, is preferably floated upon the surface of the molten metal 4, and upon this layer, at the exit end of the tank, I provide sand 40.

At the beginning of a run, the trailing end of a tow line may be attached to the leading end of the core 10, led above the tank 2, beneath the upraised rollers 26, over the roller 34, to and about the capstan 20, and thence to take-up reel 22, where it is made fast. The rollers 26 may already have been or may now be adjusted in collar 30 to give the desired depth in the tank, and when the metal 4 has been brought to the desired temperatures at the several heat zones, the frame 32, carrying rollers 26, may be lowered into running position, and the entire apparatus may be started in operation.

As the core 10 is drawn off the let-off reel, it passes through the applicator 14, where its covering is applied continuously and progressively, and as the covered core advances out of the applicator, it passes through the dusting box 16 and from thence into the tank 2.

FIG. 2 shows the rollers 26 so set that, as the covered core passes through the tank beneath these rollers, the depth of submergence of the core in the molten metal is gradually increased in the direction of travel of the assembly. The setting of the rollers 26 will depend upon the type of material being processed and type of cure desired. It will be appreciated that the greater the depth of submergence of the material in the molten metal the greater the pressure on the core covering. By setting the rollers so that the hydrostatic pressure on the core covering is minimum at lowest temperature and gradually increases as the covered core passes through hotter and hotter temperature zones, I am able to take advantage of the massaging effect on the core covering as it passes through the metal to promote the production of a smooth surface and at the same time maintain the desired cross-section of the core covering and also promote its density or freedom from pores.

As the covered core enters the tank 2 and before it actually enters the molten metal, it passes through the talc layer 38, which is upon the molten metal. This layer, it will be appreciated, is at an elevated temperature, and its heat will be transferred to the core covering. I find that this is of advantage in that it promotes avoidance of the formation of a cured crust at the surface of the core covering before curing has taken place in the interior of the covering, while at the same time it stiffens the soft green material sufficiently to avoid deleterious deformation as the material passes beneath the rolers 26. Also, as hereinabove pointed out, the talc coats the tacky material and prevents the molten metal of the bath from adhering to it.

It will be seen from FIG. 2 that the covered core passes out of the tank 2 and upwardly about the roller 34 at a steep angle. This permits any molten metal adhering to the surface of the core covering to flow off by gravity as the covered core emerges from the bath. When desired, I may employ the sand or other abrasive 40 above referred to for freeing the surface of the core covering of metal particles adhering thereto and, if necessary, the air blast or air wiper 36 above referred to.

When it is desired temporarily to halt operations, the frame 32, carrying collars 30 and rollers 26, is raised simultaneously with the cessation of movement of the covered core through tank 2. The capstan 20 is momentarily continued in operation to raise the core out of the molten metal 4, so as to hang in air between the applicator 14 and roller 34 and thus be removed from the high heat of direct contact with the molten metal 4. This prevents overcuring of that part of the core covering which was lying within the tank 2 at the time of temporary shutdown. Operations can be resumed simply by lowering the roller frame 32 into running position.

As above noted, the number and temperatures of the heat zones in the molten metal bath, depth of submergence of the thermosetting material in the metal bath, and rate of travel through the bath are all variable and depend upon the type of thermosetting material being processed and the type of cure desired. However, this presents no problem inasmuch as I have made provision for varying the temperatures of the heat zones and the depth of submergence of the thermosetting material. By way of example, I may mention that I have had excellent results when employing ternary eutectic of bismuth, tin, and lead in the continuous curing of silicone having a wall thickness of $3/64''$. The heat zones 1, 2, and 3 were maintained at 250° F., 350° F., and 400° F., respectively, while depth of submergence ranged from zero to 12 inches, and rate of travel through the bath was 100 feet per minute.

Figure 3:
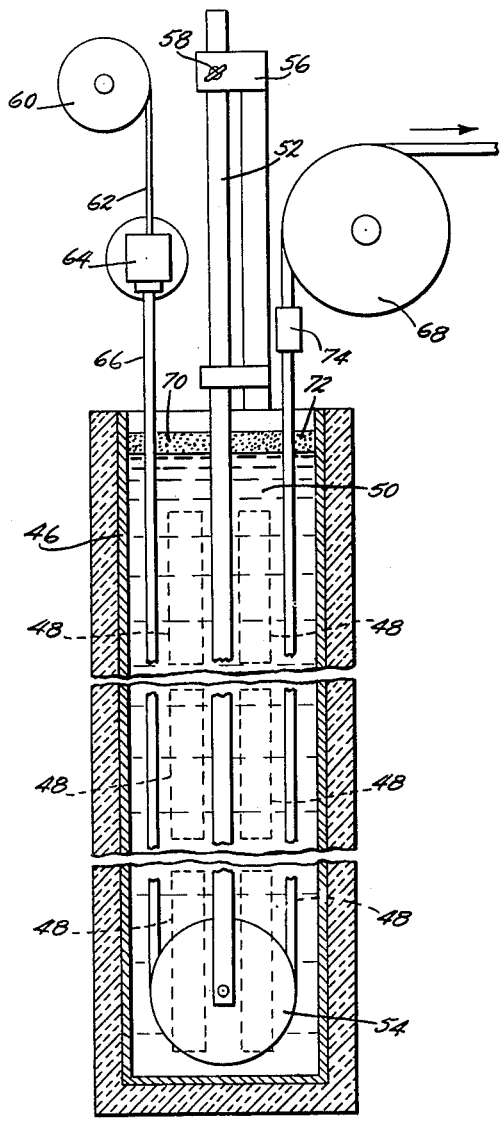
FIG. 3 is a sectional, elevational view of another form of apparatus suitable for the practice of my improved method.

In the apparatus illustrated in FIG. 3 I provide a tank 46 the depth of which is great with respect to its length as compared with the tank 2 of FIGS. 1 and 2, which is long and relatively shallow. The tank 46 is equipped with electric strip heaters 48, similar to the heaters 8 above, the heaters 48 being independently controllable so as to provide a plurality of independently controllable heat zones in the molten metal 50 within the tank, these heat zones being maintained at any desired temperatures, as explained in connection with FIGS. 1 and 2.

Extending into the tank 46 is a rod 52, carrying a roller 54 at its lower end. The rod may be supported by any suitable framework, carried by the tank for example, or otherwise supported. The framework has been designated 56, and the rod 52 is vertically adjustable in this framework and held in adjusted position by screw or bolt 58.

In this embodiment of the invention the stock to be treated enters the tank 46 vertically. Above the tank I have shown a let-off reel 60, containing a supply of wire 62. Below the let-off reel I have shown an applicator 64, corresponding to the applicator 14 of FIG. 1, and it is here that the thermosetting covering 66 is applied to the wire or core in any desired manner, as above explained. The covered core passes downwardly vertically through the molten metal about the roller 54 and then upwardly through the molten metal, thence over roller 68, which is mounted above the tank, and from thence to a suitable capstan and a take-up reel.

In this apparatus I may employ a layer 70 of talc upon the surface of the molten metal, and sand 72 where the treated material passes out of the molten metal. Inasmuch as the covered core or other article passes vertically out of the metal bath, any metal clinging to its surface tends to flow off by gravity. The sand 72 will tend to remove any particles that may remain, but, if found necessary, I may scrub the core covering with an air blast 74 after it leaves the sand 72.

As above noted, the heaters 48 are independently controllable so that, as explained in connection with FIGS. 1 and 2, the heat zones which they create may be kept at any temperatures desired, which depend to a large extent upon the type of thermosetting material being processed.

It will be appreciated that in this case also advantage is taken of the high-gravity factor of the metal to impose substantial pressure on the core covering as it is passing through the metal, this pressure, of course, depending upon the depth at which the roller 54 is set.

When it is desired temporarily to halt operations, the rod 52, carrying roller 54, may be withdrawn from the molten metal, allowing the covered core to be raised out of the molten metal 50 and hang in air between applicator 64 and roller 68 above the molten metal 50, thus preventing overcuring of the core covering during this temporary shutdown.

To resume production, roller 54 is lowered into running position, sufficient slack cable being fed in a reverse direction over roller 68 to allow roller 54 to be lowered. Operations are then resumed.

Although simple manual mechanism only is shown, it should be understood that the raising and lowering of the rollers 26 of FIGS. 1 and 2 and of roller 54 of FIG. 3 can, of course, be done by mechanical and/or electrical means and may be controlled so that the rollers are raised and lowered automatically and proper amount of slack is taken up or provided automatically and in proper sequence upon energizing the power supply to other power-driven components of the apparatus.

Alternatively, the tanks 2 of FIGS. 1 and 2 and tank 46 of FIG. 3 may be lowered during periods of temporary shutdown to remove the material being treated out of contact with the molten metal and raised to running position prior to resuming operations. Mechanism for raising or lowering the tank have not been shown.

In the embodiment of FIG. 4 I have shown an apparatus in which I progressively apply a continuous cover 12 of thermosetting material to an elongated core 10 by advancing the core and the cover material, which initially is in the form of a continuous strip or ply, between a pair of rollers R, which progressively fold the cover material longitudinally about the core to bring the edges of the material forcibly into abutting relation to provide a tight-fitting cover about the core. The covered core is advanced continuously through the surface of and into an open static body of molten metal 4, contained in a tank 2, like the tank 2 of FIG. 2. As described in connection with my description of FIG. 2, the depth of submergence of the covered core, as it advances through the molten metal 4, is gradually and progressively increased, and, as brought out in my description of FIG. 2, the temeprature of the molten metal 4 is so controlled that heat zones are provided within the metal, these zones increasing in temperature in the direction of travel of the core.

From the foregoing it will be appreciated that I have provided a method and apparatus for the curing of thermosetting materials which is very flexible as to temperatures and pressures so as readily to accommodate my invention to the curing of a great variety of materials. It will be appreciated also that, unlike many prior methods, a run may be stopped temporarily at any time without danger of overcuring or otherwise injuring the material being processed. Still further it will be appreciated that, unlike prior methods, my method uses the pressure of the molten metal of the bath and the movement of the material through this dense, high-inertia, static mass to massage and compress the material simultaneously to produce a dense, pore-free thermoset material having a very smooth surface devoid of any superficial roughness.

Although I have shown a relatively long and shallow tank in FIG. 1 and FIG. 2 and a relatively short and deep tank in FIG. 3, it should be understood that, by varying dimensions of the tank, many combinations of length and depth are possible properly to heat-treat the material being processed, and such modifications are within the scope of my invention. It is also understood that the heat zones may be varied with depth of tank as well as with length of tank.

It is to be understood further that other changes may be made in the details of construction of the apparatus hereinabove described without departing from the spirit and scope of my invention.

What I claim is:

1. The method of progressively applying a cover of thermosetting material to an advancing elongated core and continuously and progressively curing the cover, all in a continuous operation, which method comprises advancing the core longitudinally while folding an elongated, uncured strip of the material progressively and continuously about the same to bring the opposed edges of the strip into abutting relation; and advancing the covered core continuously through the surface of and into an open, static body of molten metal while gradually and progressively increasing the depth of submergence of the covered core in the bath and while so controlling the temperature of the molten metal that heat zones will be provided within the metal, these zones increasing the temperature in the direction of travel of the covered core, whereby the core cover is subjected progressively to gradually increasing temperature and gradually increasing hydrostatic pressure.

2. Apparatus for curing thermosetting materials, said apparatus comprising, in combination, an open tank containing a static body of molten metal; means for advancing the thermosetting material through said molten metal; means for gradually and progressively increasing the depth of submergence of the material as it advances through the molten metal; means for establishing heat zones within the body of molten metal; and means for maintaining the relative temperatures of the said zones at such levels that the temperature level of each subsequent zone is higher than that of the preceding zone, whereby as the material is advanced through the molten metal, the hydrostatic pressure to which it is subjected by the metal is gradually and progressively increased and the temperature to which the material is subjected is gradually and progressively increased.

3. Apparatus for the production of cores having a covering of a thermoset material, said apparatus comprising, in combination, means for folding an elongated strip of uncured, thermosetting material longitudinally about a core to bring the opposed edges of the strip into abutting relation; an open tank containing a static body of molten metal; means for advancing the covered core into and through said molten metal; means for gradually and progressively increasing the depth of submergence of the covered core in the metal; and means for establishing and maintaining different temperature zones within the body of metal, said zones being of increased temperatures in the direction of travel of the covered core through the metal, whereby the core covering is subjected progressively to gradually increasing temperature and hydrostatic pressure in its passage through the metal.

4. The continuous method of curing continuous lengths of thermosetting materials, said method comprising establishing heat zones within a static body of dense molten metal contained in an open tank; progressively submerging the material in said molten metal; by continuously forwarding the material into the molten metal through the open surface thereof; and while forwarding the submerged material through the molten metal regulating the temperature levels of the heat zones and the depth of submergence of the material in the molten metal, gradually and progressively to raise the temperature of the material as well as gradually and progressively to raise the hydrostatic pressure imposed on the material, thereby to effect a controlled rate of cure and controlled liberation of the gaseous by-products of the curing reaction accompanied by a controlled, gradually and progressively increasing massaging effect upon the surface of the material.

5. The method of producing an extruded, dense, smooth-surfaced, heat-cured, thermoset material, which method comprises establishing heat zones within a static bath of molten metal contained within a tank which is open to the atmosphere; continuously extruding the material which is to be cured; continuously and progressively submerging the extruded material in said bath by introducing the material into the bath through the open surface thereof; and, while advancing the submerged material through the bath, so regulating the relative temperatures of said heat zones that the material in its passage through the bath will be progressively subjected to gradually increasing temperatures, thereby to control the rate of formation of the gaseous by-products of the reaction.

6. The method of producing extruded, heat-cured, thermoset materials, which method comprises establishing zones at different temperatures within a static bath of molten metal contained within a tank which is open to the atmosphere; floating a heated powdered, inert material upon the surface of the bath; continuously extruding the thermosetting material in elongated form and advancing the extrusion as formed through the said heated inert material, to initiate heating of said extrusion and also to apply an adherent coating of the inert material thereto; and advancing the partially heated coated material through the surface of and into the bath of molten metal while so regulating the temperatures of the said zones and the depth of submergence of the material in the bath that, as the material advances through the molten metal, its temperature and the hydrostatic pressure to which the material is subjected are gradually and progressively raised to predetermined levels, thereby to obtain a controlled rate of cure of the material simultaneously with removal of the gaseous by-products of the curing reaction from the vicinity of the reaction.

References Cited in the file of this patent

UNITED STATES PATENTS 131,680   Hill _____ Sept. 24, 1872

(Other references on following page)

UNITED STATES PATENTS

| | | | |
|---|---|---|---|
| 768,755 | Kitsee | Aug. 30, | 1904 |
| 1,633,590 | Lamplough | June 28, | 1927 |
| 1,661,888 | Fisher | Mar. 6, | 1928 |
| 2,271,038 | Shaver | Jan. 27, | 1942 |
| 2,722,263 | Beare et al. | Nov. 1, | 1955 |
| 2,732,592 | Tunnicliff et al. | Jan. 31, | 1956 |
| 2,797,177 | Keller | June 25, | 1957 |
| 2,838,800 | Hertz | June 17, | 1958 |

FOREIGN PATENTS

| | | | |
|---|---|---|---|
| 550,895 | Great Britain | Jan. 29, | 1943 |
| 797,102 | Great Britain | June 25, | 1958 |